Oct. 27, 1925.

W. L. ADAMS 1,559,496

SHIFTING LEVER FOR FISHING REELS

Filed Aug. 13, 1923

Inventor
WALTER L. ADAMS.

By

Attorney

Patented Oct. 27, 1925.

1,559,496

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

SHIFTING LEVER FOR FISHING REELS.

Application filed August 13, 1923. Serial No. 657,153.

*To all whom it may concern:*

Be it known that I, WALTER L. ADAMS, a citizen of the United States, and a resident of Akron, county of Summit, State of Ohio, have invented certain new and useful Improvements in Shifting Levers for Fishing Reels, of which the following is a specification.

This invention relates to fishing reels and has particular reference to levers for shifting various mechanisms within the ends of reels.

In fishing reels of standard construction, it is customary to provide upon the end of the reel a hand operable lever arm which is connected to various mechanisms within the reel, such as a free spool mechanism or a spool drag, the arrangement being such that movement of the lever arm will serve to render the said mechanisms operative or inoperative, as the user of the reel desires.

It is necessary for convenience of operation to locate the shifting lever in such a position upon the reel as to be readily accessible to the operator, and generally the lever is provided with an operating handle which is adapted to extend over the end of the reel in such a position as to be readily operated by the thumb of the user.

It has been proposed heretofore to bend the free end of the lever arm over the end of the frame in a position convenient to the thumb of the user. Such an arrangement, however, has been found to provide too small an engaging surface for the efficient operation of the lever.

It has also been proposed to weld an operating handle to the end of the lever, but the expense of manufacture and the liability of breaking has been found very objectionable.

It is an object of this invention to overcome the objection mentioned and to provide a shifting lever which is easy to operate, durable in structure and comparatively cheap to manufacture.

Other objects and advantages of my invention will be apparent by reference to the following description when read in connection with the accompanying drawings illustrating a preferred embodiment thereof, in which—

Figure 1:
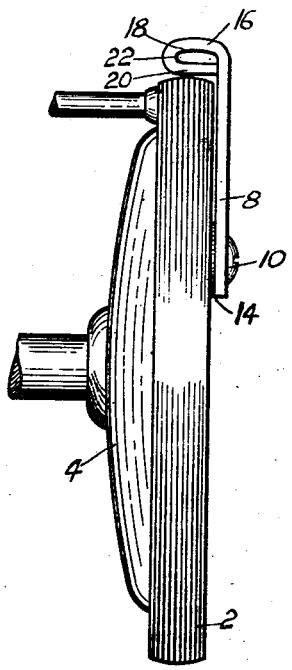
Figure 2:
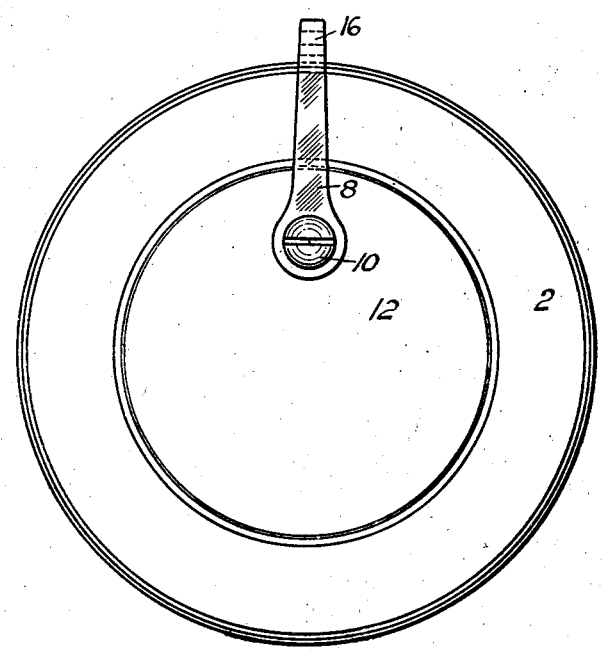

Figure 1 is a side elevation of one end of the reel showing the shifting lever attached; and Figure 2 is an end elevation.

Referring to the drawings, 2 indicates one end of the reel frame within which a spool 4 is mounted. A shifting lever 8 is pivoted at 10 to the outer face 12 of the frame end. A spring washer 14 may be placed between the lever and the frame to space the ... er therefrom and provide friction for the lever as it is rotated about its pivot. The pivoted end of the lever arm 8 is connected by suitable means with various mechanisms within the frame end as will be understood by those skilled in the art to which this invention appertains, neither the connection or the mechanisms forming a part of the present invention. The outer end of the lever arm is provided with a portion 16 bent at right angles thereto and adapted to extend inwardly over the frame end in a position to be engaged by the thumb or fingers of the user. The end portion 16 is bent back upon itself to form a closed loop 18, the lower arm 20 of which is substantially parallel to the portion 16 and spaced therefrom by a vertical end 22.

It will be evident from the above description that the loop 18 will afford a broad operating surface through which the lever arm 8 can be readily operated. Moreover, the lever is simple in construction, cheap to manufacture and is not easily broken.

Various changes may be made in the form and construction of the invention without departing from the spirit or scope thereof or sacrificing any of the material advantages thereof, the form herein illustrated being merely the preferred embodiment thereof.

Having described my invention, what I claim as new and desire to secure by Letters Patent of the United States is:

In a fishing reel an end member, a lever pivoted on said end member, the end of the lever extending to the outer periphery of the end member and having an integral operating extension formed by bending the end of the lever so as to form a closed flattened loop lying over the rim of the end member.

WALTER S. ADAMS.